United States Patent [19]
Ito et al.

[11] Patent Number: 4,794,054
[45] Date of Patent: Dec. 27, 1988

[54] PLATINUM ALLOY ELECTROCATALYST AND ACID-ELECTROLYTE FUEL CELL ELECTRODE USING THE SAME

[75] Inventors: Takashi Ito, Ichikawa; Shigemitsu Matsuzawa, Edogawa; Katsuaki Kato, Ichikawa, all of Japan

[73] Assignee: Nippon Engelhard Ltd., Tokyo, Japan

[21] Appl. No.: 67,423

[22] Filed: Jun. 24, 1987

Related U.S. Application Data

[63] Continuation of Ser. No. 855,736, Apr. 25, 1986, abandoned.

[51] Int. Cl.$^4$ .............................................. H01M 4/92
[52] U.S. Cl. ....................................... 429/44; 429/40; 502/326
[58] Field of Search ..................... 502/326, 177, 185; 429/40, 44

[56] References Cited

U.S. PATENT DOCUMENTS

| | | | |
|---|---|---|---|
| 4,163,750 | 8/1979 | Bird et al. | 502/185 |
| 4,186,110 | 1/1980 | Jalan et al. | 252/447 |
| 4,202,934 | 5/1980 | Jalan et al. | 429/40 |
| 4,297,245 | 10/1981 | Bartley et al. | 502/326 |
| 4,316,944 | 2/1982 | Landsman et al. | 429/40 |
| 4,359,406 | 11/1982 | Fung | 252/437 |
| 4,447,506 | 5/1984 | Luczak et al. | 429/44 |

Primary Examiner—John F. Niebling
Assistant Examiner—Steven P. Marquis
Attorney, Agent, or Firm—Watson, Cole, Grindle & Watson

[57] ABSTRACT

A platinum alloy electrocatalyst composed of a platinum-iron-cobalt alloy comprising 40 to 80 atomic percent of platinum, 10 to 40 atomic percent of iron and 10 to 40 atomic percent of cobalt supported on a suitable carrier has outstandingly high stability and catalytic activity. Electrodes using such an electrocatalyst (particularly when used as cathodes in acid-electrolyte fuel cells) remain stable for longer periods and have more than 30% higher output than electrodes using conventional catalysts.

20 Claims, No Drawings

PLATINUM ALLOY ELECTROCATALYST AND ACID-ELECTROLYTE FUEL CELL ELECTRODE USING THE SAME

This application is a continuation of application Ser. No. 855,736 filed Apr. 25, 1986 now abandoned.

BACKGROUND OF THE INVENTION

1. Technial Field

The present invention relates to platinum alloy electrocatalysts and to acid-electrolyte fuel cell electrodes using the same.

2. Description of the Prior Art

A fuel cell is an electrochemical device for direct conversion of a fuel, such as hydrogen gas and hydrocarbons, and an oxidizing agent, such as oxygen gas, to a low-voltage direct current. It generally comprises a fuel electrode (anode), an oxidizer electrode (cathode), an electrolyte placed between the two electrodes, and means to separately introduce fuel and oxidizer streams to the anode and the cathode, respectively.

In operation, the fuel supplied to the anode is brought into contact with the electrocatalyst and oxidized in the presence of the electrolyte, liberating electrons. The oxidizing agent, on the other hand, is fed to the cathode, where it is reduced on the surface of electrocatalyst in the presence of the electrolyte, consuming the electrons transferred from the anode via an external circuit and generating the electric power.

As is apparent from the above, a fuel cell requires electrocatalysts for both the anode and cathode. It is known that, of the Group-8 metals of the Periodic Table (Fe, Ru, Os), Group-9 metals (Co, Rh, Ir) and Group-10 metals (Ni, Pd, Pt), the "platinum group metals" (Pt, Pd, Rh, Ru, Ir and Os) can be advantageously used, either alone or in combination, as the electrocatalyst. It is common practice that such a platinum group metal, or a combination thereof, is supported on a conductive carrier material, such as conductive carbon black, in a well dispersed form and the catalyst thus obtained is fixed to a support member, such as wetproof graphite paper, thus making up an electrode.

The output efficiency of a fuel cell is dictated by a number of factors, but its dependency upon the activity and service life of the cathode catalyst is by far the most outstanding. It is well known that in oxygen-hydrogen feed phosphoric acid fuel cells, for example, the activation polarization of oxygen reduction at the cathode is far larger than that of hydrogen oxidation at the anode. When an electrocatalyst supporting a platinum group metal (for example platinum) is used as cathode, sintering or growth of platinum crystallites tend to progress during cell operation, significantly decreasing the active surface area of the metal catalyst, which can lead to reduction in the cell output and in overall operation efficiency.

To eliminate such difficulties, a wide variety of studies have been made on supported metal catalysts. These include alloys of a platinum group metal with various other metals, primarily Group 2 to 6 base metals such as vanadium, tungsten, aluminum, titanium, silicon, cerium, strontium and chromium (U.S. Pat. Nos. 4,186,110, 4,202,934 and 4,316,944); ternary alloys prepared by adding cobalt to platinum-vanadium or platinum-chromium alloys (U.S. Pat. No. 4,447,506); and alloys of a platinum group metal with gallium, or superlattice alloys between a platinum group metal and iron [Japanese Patent Application Laid-open Nos. 7941 and 156551(1985)].

None of these catalysts, however, is completely satisfactory, leaving much room for further study; some of these have a sufficiently high initial activity, but tend to lose their activity in a relatively short time, and others retain their activity for long periods, but the level of activity is not sufficiently high.

SUMMARY OF THE INVENTION

The object of the present invention is to provide new electrocatalysts and fuel cell electrodes which are free from the disadvantages mentioned above. We have found that this object can be achieved by a platinum alloy electrocatalyst composed of a platinum-iron-cobalt (Pt-Fe-CO) alloy comprising 40 to 80 atomic percent of platinum (Pt), 10 to 40 atomic percent of iron (Fe) and 10 to 40 atomic percent of cobalt (Co) supported on a carrier in a well dispersed form, and by an electrode composed of this platinum alloy and a conductive, acid-resistant support member that supports the electrocatalyst.

DETAILED DESCRIPTION OF THE INVENTION

The platinum alloy electrocatalyst of the present invention is composed of a Pt-Fe-Co ternary alloy and a carrier that supports the platinum alloy. If the content of iron or cobalt in the ternary alloy is less than about 10 atomic percent, the effect of added iron and cobalt is not sufficient and the resultant alloy barely shows the performances comparable to binary alloy catalysts (platinum-iron or platinum-cobalt). On the other hand, if the content of iron or cobalt exceeds 40 atomic percent of the content of platinum is less than 40 atomic percent, the relative amount of iron or cobalt that can form an alloy with platinum decreases, leaving chemical speries of iron and cobalt other than the ternary alloy in the catalyst. The result is an adverse effect upon catalytic activity, rather than the intended effect of added iron and cobalt.

The Pt-Fe-Co alloy having the composition as specified above should preferably be supported on a carrier in such a finely dispersed form that it has a metal surface area of 30 $m^2/g$ or higher, most preferably 60 $m^2/g$ or higher. If the metal surface area is less than 30 $m^2/g$, the resulting alloy has the lower cost performance because of the lower catalytic activity per unit weight.

Such ternary alloys as specified above are supported on a conductive, carbonaceous material such as conductive carbon black, acetylene black and graphite or a metal carbide such as tungsten carbide. Illustrative examples include commercial carbon black, such as Vulcan XC-72R and XC-72 (products of Cabot Corp.) and Conductex 975 (product of Columbian Chemicals Co.), and commercial acetylene black such as Shawinigan Black (product of Gulf Oil Corp.). Of these, Vulcan XC-72 and Conductex 975 should preferably be heat-treated, before use, in vacuum or in an inert gas atmosphere to effect partial graphitization, thereby enhancing the corrosion resistance required of an electrocatalyst carrier to be placed in service under the operating conditions where a high-temperature electrolyte and oxidizer exist.

These carriers generally have a surface area of about 60 to 250 $m^2/g$ and a particle size of about 0.1 to 50 microns.

In such electrocatalysts of the present invention, the amount of the supported Pt-Fe-Co alloy is normally in the range from 0.1 to 30%, based on the total weight of catalyst, preferably in the range from 5 to 15%.

If the alloy loading exceeds 30 weight %, its dispersion will be reduced, making it difficult to expect an improvement in catalyst performance proportionate to the increase in the loading. The result is lowered cost-effectiveness of the use of the carrier. If the loading of alloy is excessively low, on the other hand, the activity per unit weight of catalyst will be lower because there is an upper limit for the degree of alloy dispersion.

The platinum alloy electrocatalysts of the present invention may be prepared, for example, according to the procedures given below.

A powdery carrier material, such as conductive carbon black, is brought into contact with an aqueous solution or dispersion (slurry) containing the compounds of individual alloy components to allow each compound to be impregnated in, or adsorbed on, the carrier material. The metal compounds were then reduced to corresponding metals by heat treatment in the presence of a suitable reducing agent. As the compound of platinum, bivalent or tetravalent chloroplatinic acid, bivalent or tetravalent chloroplatinate, or solubilized $H_2Pt(OH)_6$ may be used. Ferrous chloride, ferric chloride, ferrous nitrate, ferric nitrate, ferrous sulfate and ferric sulfate may be mentioned as examples of the iron compounds, and cobaltous chloride, cobaltous nitrate and cobaltous sulfate may be mentioned as examples of the cobalt compounds.

These metal compounds may be deposited on the carrier material by using a solution or dispersion containing all three types of metal compounds (the so-called three-component simultaneous deposition process). However, it is preferable to first prepare a supported platinum catalyst (with Pt alone deposited on the carrier material), and than to deposit Fe and Co either simultaneously, separately in that order, or separately in the reverse order (the so-called stepwise deposition process).

Alloying platinum with another metal generally causes a change in its lattice constant, which can be detected by a shift of diffraction peaks in X-ray diffraction analysis. When platinum is alloyed with iron and cobalt in the process of this invention, its face-centered cubic lattice constant $d=3.923$Å is shifted toward the face-centered cubic lattice constant of iron $d=3.72$Å (a value extrapolated from the face centered cubic lattice constant at high temperatures, because iron has a body-centered cubic structure at normal temperature,), or toward the face-centered cubic lattice constant of cobalt $d-3.555$Å, by a magnitude determined by the particular composition.

The temperature and time needed for alloying depend primarily upon the particle size and dispersion degree of the component metals or their compounds on the carrier material prior to alloying operation. Alloying proceeds to a considerable extent even at about 600° C. when fine particles are evenly dispersed, but a temperature of some 900° C. is generally necessary to ensure complete alloying. The Pt-Fe-Co alloys of the present invention have a lattice constant d in the range from 3.76 to 3.86Å if sufficiently alloyed.

Acid-electrolyte fuel cell electrodes of the present invention using such platinum-alloy electrocatalysts are described below.

The fuel cell electrodes of the present invention are composed of a Pt-Fe-Co alloy catalyst fixed to a conductive support member, such as a nickel net and wetproof graphite paper, by using an acid-resistant, wetproof binder, such as polytetrafluoroethylene, polyfluoroethylene-propylene and trifluoroalkoxypolyethylene, and are useful particularly as oxygen reduction cathodes for acid-electrolyte fuel cells (especially phosphoric acid fuel cells).

The above-mentioned binders serve not only to bond the catalyst to the support member, but to make the electrode permeable to feed gases, such as hydrogen and oxygen, in the electrolyte, thus forming a gas-liquid-solid ternary interface.

The electrodes of the present invention may be fabricated according to the procedures given below.

A Pt-Fe-Co alloy catalyst is first prepared as described above, which is mixed with a suspension of polytetrafluoroethylene (commercially available from DuPont under the tradename of TEFLON) or other binder made of an acid-resistant polymer, giving a homogeneous suspension. This catalyst-binder suspension is then deposited, by the filtration/suction process or by spraying, on a support member previously wetproofed with the same acid-resistant polymer as above, followed by sintering in air.

It is advisable that the Pt-Fe-Co alloy be provided on the electrode support member in an catalytically effective amount—normally in the range from about 0.1 to 2 mg per square centimeter of geometrical surface area of that support member, preferably in the range from about 0.2 to 1 mg/cm$^2$, more preferably in the range from about 0.3 to 0.7 mg/cm$^2$.

The platinum alloy electrocatalysts of the present invention have outstandingly high stability and catalytic activity. In addition, the electrodes of the present invention using such electrocatalysts (particularly when used as cathodes for acid-electrolyte fuel cells) remain stable for longer periods and have more than 30% higher output at the same efficiency, compared with electrodes using platinum catalyst or conventional platinum alloy catalysts. Hence cells using such electrodes, particularly acid-electrolyte fuel cells, have high industrial value because of their high performance, long service life and very high cost-effectiveness.

The following Examples further illustrate the invention.

PREPARATIVE EXAMPLE 1

Eighty-one grams of heat-treated, conductive carbon black (Cabot Corp.; Vulcan XC-72R) having a surface area of 110 m$^2$/g was slurried in 1500 g deionized water containing 4.0 g glacial acetic acid. Separately, $H_2Pt(OH)_6$ (9.0 g as Pt) was solubilized in 600 g deionized water by the acid of an amine. This platinum solution was added to the slurry of carbon black prepared above with stirring, and the resulting slurry was gradually heated to about 95° C. while slowly adding 50 g of 5% formic acid as a reducing agent. After being maintained at that temperature for 30 minutes, the mixture was allowed to cool to room temperature and filtered, and the solid collected was washed with deionized water and dried at 95 C for 16 hours in a nitrogen stream. The carbon-supported platinum catalyst containing 10 weight % platinum thus prepared (C-1*) (mark * indicates comparative example) had a metal surface area of 120 m$^2$/g.

PREPARATIVE EXAMPLE 2

Preparation of Supported Pt-Fe-Co Catalyst (Fe-Co Coprecipitation Method)

Fifty grams of the supported platinum catalyst obtained in Preparative Example 1 (C-1*) was dispersed in 1000 ml distilled water, and to this slurry was added 150 g of an aqueous solution containing ferric nitrate (0.72 g as Fe) and cobaltous nitrate (0.79 g as Co) with vigorous stirring. After adjusting the pH to 8.0 by slowly adding a dilute aqueous solution of hydrazine, stirring was continued for one hour to deposit chemical species of Fe and Co on said supported platinum catalyst, the resulting slurry was filtered, and the solid collected was dried at 95° C. in a nitrogen atmosphere and then heat-treated at 900° C. for one hour under a 7 volume-% hydrogen (balance being nitrogen) stream, affording a carbon-supported Pt-Fe-Co catalyst (C-2) (atomic ratio; 2:1:1).

The formation of ternary Pt-Fe-Co alloy was confirmed by X-ray diffraction analysis, which indicated a shift of face-centered cubic lattice constant d from 3.923Å for Pt to 3.817Å for Pt-Fe-Co. The crystallite size was 35Å. Observation by a high resolution scanning a transmission electron microscope combined with an energy dispersive X-ray analyzer revealed that the platinum:iron:cobalt atomic ratio in the alloy particles was 2:1:1.

PREPARATIVE EXAMPLE 3

A supported Pt-Fe alloy catalyst (C-3*) was prepared in the same manner as in Preparative Example 2, except that ferric nitrate (0.72 g as Fe) alone was deposited on the carbon-supported platinum catalyst. The formation of $Pt_3Fe$ superlattice alloy having a crystallite size of 33Å and a lattice constant d=3.866Å was confirmed by X-ray diffraction analysis.

PREPARATIVE EXAMPLE 4

A Pt-Fe-Co alloy catalyst (C-4) was prepared starting from the supported Pt-Fe alloy catalyst obtained in Preparative Example 3, in the same manner as in Preparative Example 2 except that cobaltous nitrate (0.79 g as Co) alone was deposited. The formation of Pt-Fe-Co alloy having a crystallite size of 34Å and a lattice constant d=3.827Å was confirmed by X-ray diffraction analysis.

PREPARATIVE EXAMPLE 5

Pt-Fe-Co alloy catalysts (C-5, C-6, C-7 and C-8) having Pt:Fe:Co atomic ratios of 4:1:1, 3:1:1, 3:2:1 and 2:1:2, respectively, were prepared in the same manner as in Preparative Example 2 by using varying amounts of ferric nitrate and cobaltous nitrate. The lattice constants of these alloys were in the range of d=3.812 to 3.861Å.

PREPARATIVE EXAMPLE 6

A supported Pt-Co alloy catalyst (C-9*) was prepared in the same manner as in Preparative Example 2, except that cobaltous nitrate (0.79 g as Co) alone was deposited on the carbon-supported platinum catayst. The formation of Pt-Co alloy having a crystallite size of 32Å and a lattice constant d=3.876Å was confirmed by X-ray diffraction analysis.

PREPARATIVE EXAMPLE 7

Pt-Fe-Co alloy catalysts (C-10*, C-11* and C-12*) having Pt:Fe:Co atomic ratios of 9:1:1, 8:4:1 and 1:1:1, respectively, were prepared in the same manner as in Preparative Example 2 by using varying amounts of ferric nitrate and cobaltous nitrate. The lattice constants of these alloys were d=3.883Å for C-10*, d=3.839Å for C-11* and d=3.777Å for C-12*.

PREPARATIVE EXAMPLE 8

A supported Pt-Cr alloy catalyst (C-13*) was prepared in the same manner as in Preparative Example 2, except that chromic nitrate (0.73 g as Cr) alone was deposited on the carbon-supported platinum catalyst. The formation of Pt-Cr alloy having a crystallite size of 35Å and a lattice constant d=3.866Å was confirmed by X-ray diffraction analysis.

PREPARATIVE EXAMPLE 9

A supported Pt-Cr-Co alloy catalyst (C-14*) was prepared in the same manner as in Preparative Example 2, except that chromic nitrate (0.73 g as Cr) and cobaltous nitrate (0.79 g as Co) were deposited on the carbon-supported platinum catalyst. The formation of Pt-Cr-Co alloy having a crystallite size of 36Å and a lattice constant d=3.827Å was confirmed by X-ray diffraction analysis.

EXAMPLES 1 THROUGH 6

COMPARATIVE EXAMPLE 1 THROUGH 8

(1) Electrode Fabrication

Each of the catalysts (C-1* through C-14*) obtained in Preparative Examples 1 through 9 was dispersed in an aqueous suspension of polytetrafluoroethylene (DuPont; TEFLON® TFE-30) by ultrasonic blending. Aluminum chloride was added to the resulting suspension to cause precipitation of cotton-like floc, which contained 50 percent of catalyst and 50 percent of polytetrafluoroethylene by weight on dry basis. This floc was spread on a support member, made of graphite paper previously wetproofed with polytetrafluoroethylene, to provide a platinum loading of 0.5 mg/cm² electrode area, dried after pressing, and sintered in air at 350° C. for 15 minutes, giving an electrode. The electrodes thus prepared from catalysts C-1* through C-14* were named E-1* through E-14*, respectively.

(2) Air-electrode Half Cell Testing

Air-electrode half cell performance of E-1* through E-14* were measured using 105% phosphoric acid as electrolyte at 200° C. and introducing air at a rate of 600 ml/min.

Table 1 shows the IR-free, half-cell potentials (v.s. reversible hydrogen electrode) at a current density of 200 mA/cm². As can be seen from the table, electrodes E-2, E-4, E-5, E-6, E-7 and E-8 of the present invention, which employ the Pt-Fe-Co alloy catalysts of the present invention containing about 40 to 80 atomic percent of platinum, about 10 to 40 atomic percent of iron and about 10 to 40 atomic percent of cobalt, showed at least 8 mV higher potentials, compared with electrode E-1* using a catalyst made of platinum alone, electrode E-3* using a Pt-Fe alloy catalyst, electrode E-9* using a Pt-Co alloy catalyst, and electrode E-14* using a ternary Pt-Cr-Co alloy catalyst. Electrodes E-2 and E-4, in particular, which employ a Pt-Fe-Co alloy of 2:1:1 atomic ratio, were 25 to 35 mV more active than electrode E3* using a Pt-Fe alloy catalyst. It was also demonstrated that addition of cobalt alone to platinum (E-9*) is not so effective in enhancing catalytic activity; addition of the third component has substantially no effect when the amount of iron or cobalt is less than 10 atomic percent (E-10*) and when a small amount of cobalt (less than 10 atomic percent) is added to a 2:1 Pt-Fe alloy (E-11*); and the activity of Pt-Fe-Co alloys is rather low when the amount of platinum is less than 40 atomic percent and both the amount of iron and cobalt are larger than 30 atomic percent (E-12*).

TABLE 1

| | Electrode | Catalyst** | Composition (atom %) | Half-cell Potential (mV) (200° C., 200 mA/cm²) |
|---|---|---|---|---|
| Example | | | | |
| 1 | E-2 | Pt—Fe—Co/C | 50:25:25 | 785 |
| 2 | E-4 | Pt—Fe—Co/C | 50:25:25 | 795 |
| 3 | E-5 | Pt—Fe—Co/C | 67:17:17 | 770 |
| 4 | E-6 | Pt—Fe—Co/C | 60:20:20 | 772 |
| 5 | E-7 | Pt—Fe—Co/C | 50:33:17 | 775 |
| 6 | E-8 | Pt—Fe—Co/C | 40:20:40 | 770 |
| Comp. Ex. | | | | |
| 1 | E-1* | Pt/C | | 740 |
| 2 | E-3* | Pt—Fe/C | 67:33 | 760 |
| 3 | E-9* | Pt—Co/C | 67:33 | 745 |
| 4 | E-10* | Pt—Fe—Co/C | 82:9:9 | 749 |
| 5 | E-11* | Pt—Fe—Co/C | 62:31:7 | 760 |
| 6 | E-12* | Pt—Fe—Co/C | 34:33:33 | 760 |
| 7 | E-13* | Pt—Cr/C | 67:33 | 754 |
| 8 | E-14* | Pt—Cr—Co/C | 50:25:25 | 762 |

**/C represents that carbon black is used as carrier.

EXAMPLE 7

COMPARATIVE EXAMPLES 9 AND 10

(Single Cell Testing)

Experimental fuel cells (single cells) were assembled using electrode E-1* as anode and each of electrodes E-1*, E-3* and E-4 as cathode. Each cell was operated using phosphoric acid as elctrolyte at 190° C. and at a current density of 160 mA/cm² while introducing hydrogen gas and air to the anode and cathode, respectively, and the terminal voltage (IR free) was measured after 200 hours of operation. The result is shown in Table 2. As may be apparent from the table, the Pt-Fe-Co alloy catalyst showed, in this single cell test too, better performances than the Pt-Fe alloy catalyst, not to mention the catalyst containing Pt alone. Current density at the same voltage of 750 mV was compared from the current-voltage curves obtained in the test. It was 120 mA/cm² for cathode E-3* and 160 mA/cm² for cathode E-4. This indicates that a fuel cells in which the Pt-Fe-Co alloy catalyst is used as cathode shows a 33% higher output density than that using the Pt-Fe catalyst as cathode when compared at the same efficiency..

TABLE 2

| | Electrode | Catalyst** | Terminal Voltage after 200 Hrs (mV, IR free) |
|---|---|---|---|
| Example 7 | E-4 | Pt—Fe—Co/C | 750 |
| Comp. Ex. 9 | E-1* | Pt/C | 680 |
| Comp. Ex. 10 | E-3* | Pt—Fe/C | 734 |

**/C represents that carbon black is used as carrier.

EXAMPLES 8 AND 9

COMPARATIVE EXAMPLES 11 THROUGH 15

(Catalyst Stability Testing)

Two grams of catalyst (C-2) was dispersed in 160 ml of 105% phosphoric acid, and the slurry thus obtained was held at 200°−0.5° C. for five hours under an air stream while agitating with a stirring rod at a speed of 200 rpm. After cooling to room temperature, the slurry was diluted with deionized water and filtered, the solid residue was thoroughly washed with deionized water, and the amount of platinum in the filtrate was analyzed. The particle size of the dried residue (catalyst) was determined by X-ray diffraction analysis. Similar tests were also conducted for catalysts, C-1*, C-3*, C-4, C-9*, C-13* and C-14*. These results are summarized in Table 3.

TABLE 3

| | Electrode | Catalyst | Dissolution Loss of Pt in $H_3PO_4$ (wt %) | Metal Particle Size (A) Before Test | Metal Particle Size (A) After Test |
|---|---|---|---|---|---|
| Example | | | | | |
| 8 | C-2 | Pt—Fe—Co/C | 1 | 35 | 35 |
| 9 | C-4 | Pt—Fe—Co/C | 1 | 34 | 34 |
| Comp. Ex. | | | | | |
| 11 | C-1* | Pt/C | 30 | 23 | 110 |
| 12 | C-3* | Pt—Fe/C | 15 | 33 | 43 |
| 13 | C-9* | Pt—Co/C | 4 | 32 | 39 |
| 14 | C-13* | Pt—Cr/C | 8 | 35 | 48 |
| 15 | C-14* | Pt—Cr—Co/C | 5 | 36 | 37 |

The test conditions adopted in this test (stirring in air at 200° C. for five hours) are considered to correspond to 3000 to 4000 hours of normal operation of phosphoric acid fuel cells, in terms of the effect upon the degree of catalyst sintering. As can be seen from Table 3, the Pt-Fe-Co alloy catalyst of the present invention has higher stability (less tendency of platinum dissolving out into electrolyte and less change in metal particle size), ocmpared with the Pt-Cr-Co alloy catalyst and binary alloy catalysts, not to mention the catalyst containing platinum alone.

EXAMPLES 10 AND 11

COMPARATIVE EXAMPLES 16 THROUGH 19

(Electrode Stability Testing)

Each of electrodes E-1*, E-2, E-3*, E-4, E-13* and E-14* was kept immersed in an accelerated aging cell containing 100 ml of 105% phosphoric acid at 200° C. for 50 hours under a pure nitrogen gas stream while applying a constant voltage of +700 mV V.S. reversible hydrogen reference electrode, and the surface area of platinum or platinum alloy was measured before and after the test. The result is summarized in Table 4.

TABLE 4

| | Electrode | Catalyst | Metal Surface Area (m²/g) Before Test | Metal Surface Area (m²/g) After Test | Retention |
|---|---|---|---|---|---|
| Example | | | | | |
| 10 | E-2 | Pt—Fe—Co/C | 90 | 62 | 69% |
| 11 | E-4 | Pt—Fe—Co/C | 82 | 58 | 70% |
| Comp. Ex. | | | | | |
| 16 | E-1* | Pt/C | 120 | 48 | 40% |
| 17 | E-3* | Pt—Fe/C | 81 | 50 | 62% |
| 18 | E-13* | Pt—Cr/C | 96 | 55 | 57% |
| 19 | E-14* | Pt—Cr—Co/C | 77 | 51 | 66% |

As is apparent from the table, the accelerated aging test as cathode also indicates that the Pt-Fe-Co alloy catalyst of the present invention has higher stability, compared with the Pt-Cr-Co alloy catalyst and binary alloy catalysts, not to mention the catalyst containing platinum alone.

We claim:

1. In a fuel cell which includes an anode, a cathode and an electrolyte between the anode and the cathode, the improvement wherein said cathode comprises a conductive carrier and an electrocatalyst supported in dispersed form on said conductive carrier, said electrocatalyst being composed of a platinum-iron-cobalt alloy that contains 40 to 80 atomic percent platinum, 10 to 40 atomic percent iron and 10 to 40 atomic percent cobalt, said platinum-iron-cobalt alloy having a face centered cubic lattice structure of lattice constant d in the range of 3.76 Å to 3.86 Å.

2. The electrocatalyst as defined in claim 1 wherein said conductive carrier is a conductive material selected from the group consisting of carbon black, acetylene black, graphite and tungsten carbide.

3. The electrocatalyst as defined in claim 1 wherein the amount of said supported platinum-iron-cobalt alloy is in the range from 0.1 to 30 percent, based on the total weight of said electrocatalyst.

4. The electrocatalyst as defined in claim 1 wherein the amount of said supported platinum-iron-cobalt alloy is in the range from 5 to 15 percent, based on the total weight of said electrocatalyst.

5. The electrocatalyst as defined in claim 1 wherein said platinum-iron-cobalt alloy has, in its dispersed form, a surface area of at least 30 m$^2$/g.

6. The electrocatalyst as defined in claim 5, wherein said platinum-iron-cobalt alloy has, in its dispersed form, a surface area of at least 60 m$^2$/g.

7. The electrocatalyst as defined in claim 1 wherein said conductive carrier has a surface area in the range from 60 to 250 m$^2$/g and a particle size in the range from 0.1 to 50 μm.

8. The electrocatalyst as defined in claim 1 wherein said platinum-iron-cobalt alloy has been formed by reduction of a mixture of compounds of component metals.

9. The electrocatalyst as defined in claim 8, wherein the compound of platinum is a member selected from the group consisting of bivalent chloroplatinic acid, tetravalent chloroplatinic acid, bivalent chloroplatinate tetravalent choloroplatinate and solubilized H$_2$Pt(OH)$_6$.

10. The electrocatalyst as defined in claim 8, wherein the compound of iron is a member selected from the group consisting of ferrous chloride, ferric chloride, ferrous nitrate, ferric nitrate, ferrous sulfate and ferric sulfate.

11. The electrocatalyst as defined in claim 8, wherein the compound of cobalt is a member selected from the group consisting of cobaltous chloride, cobaltous nitrate and cobaltous sulfate.

12. The electrocatalyst as defined in claim 1 wherein said platinum-iron-cobalt alloy has been formed by stopwise loading and reduction of compounds of component metals.

13. The electrocatalyst as defined in claim 12, wherein the compound of platinum is a member selected from the group consisting of bivalent chloroplatinic acid, tetravalent chloroplatinic acid, bivalent chloroplatinate, tetravalent chloroplatinate and solubilized H$_2$Pt(OH)$_6$.

14. The electrocatalyst as defined in claim 12, wherein the compound of iron is a member selected from the group consisting of ferrous chloride, ferric chloride, ferrous nitrate, ferric nitrate, ferrous sulfate and ferric sulfate.

15. The electrocatalyst as defined in claim 12, wherein the compound of cobalt is a member selected from the group consisting of cobaltous chloride, cobaltous nitrate and cobaltous sulfate.

16. The electrode as defined in claim 1, wherein said cathode includes a support member made of wetproof graphite paper or a nickel net.

17. The electrode as defined in claim 16 wherein an acidresistant, wetproof binder is used to fix the electrocatalyst to said support member.

18. The electrode as defined in claim 17, wherein said binder is a polymer selected from the group consisting of polytetrafluoroethylene, polyfluoroethlene-propylene and trifluoroalkoxypolyethylene.

19. The electrode as defined in claim 16, wherein said platinum-iron-cobalt alloy is present on said support member at a concentration of 0.1 to 2 mg per square centimeter of geometric surface area.

20. The electrode as defined in claim 19, wherein said platinum-iron-cobalt alloy is present on said support member at a concentration of 0.3 to 0.7 mg per square centimeter of geometric surface area.

* * * * *

UNITED STATES PATENT AND TRADEMARK OFFICE
CERTIFICATE OF CORRECTION

PATENT NO. : 4,794,054
DATED : December 27, 1988
INVENTOR(S) : Takashi Ito et al.

It is certified that error appears in the above-identified patent and that said Letters Patent is hereby corrected as shown below:

Title page:

[30] Foreign Application Priority Data

January 13, 1986    Japan    .......... 4717/61

Signed and Sealed this

Thirtieth Day of May, 1989

Attest:

DONALD J. QUIGG

*Attesting Officer*    *Commissioner of Patents and Trademarks*